(12) United States Patent
Kurian et al.

(10) Patent No.: US 11,113,396 B2
(45) Date of Patent: Sep. 7, 2021

(54) DATA MANAGEMENT SYSTEM AND METHOD

(71) Applicant: Bank of America Corporation, Charlotte, NC (US)

(72) Inventors: Manu Kurian, Dallas, TX (US); Jo-Ann Taylor, Godalming (GB)

(*) Notice: Subject to any disclaimer, the term of this patent is extended or adjusted under 35 U.S.C. 154(b) by 220 days.

(21) Appl. No.: 16/282,674

(22) Filed: Feb. 22, 2019

(65) Prior Publication Data

US 2020/0272732 A1    Aug. 27, 2020

(51) Int. Cl.
| G06F 21/55 | (2013.01) |
| G06F 21/16 | (2013.01) |
| G06F 21/54 | (2013.01) |

(52) U.S. Cl.
CPC ............ *G06F 21/556* (2013.01); *G06F 21/16* (2013.01); *G06F 21/54* (2013.01); *G06F 21/552* (2013.01); *G06F 2221/0737* (2013.01)

(58) Field of Classification Search
CPC ........ G06F 21/556; G06F 21/16; G06F 21/54; G06F 21/552; G06F 2221/0737
See application file for complete search history.

(56) References Cited

U.S. PATENT DOCUMENTS

| 7,467,202 | B2 | 12/2008 | Savchuk |
| 7,735,116 | B1* | 6/2010 | Gauvin ................. G06F 21/552 |
| | | | 726/2 |
| 9,197,628 | B1 | 11/2015 | Hastings |
| 9,225,734 | B1 | 12/2015 | Hastings |
| 9,430,646 | B1 | 8/2016 | Mushtaq et al. |
| 9,716,598 | B2 | 7/2017 | Kubota et al. |
| 9,756,017 | B2 | 9/2017 | Hastings |
| 9,779,254 | B2 | 10/2017 | Galil et al. |
| 9,934,381 | B1 | 4/2018 | Kindlund et al. |
| 10,291,644 | B1* | 5/2019 | Hotta ..................... H04L 63/18 |
| 2002/0116318 | A1* | 8/2002 | Thomas ................. G06Q 10/08 |
| | | | 705/37 |
| 2003/0182442 | A1* | 9/2003 | Shorter ................. G06F 16/258 |
| | | | 709/238 |
| 2005/0050099 | A1* | 3/2005 | Bleistein ................ G06Q 30/06 |
| 2013/0232565 | A1* | 9/2013 | O'Connor .......... H04L 63/0227 |
| | | | 726/13 |
| 2015/0350174 | A1* | 12/2015 | Reno ....................... H04L 67/10 |
| | | | 726/3 |
| 2016/0011245 | A1 | 1/2016 | Gerber et al. |
| 2017/0093685 | A1* | 3/2017 | Retana .................... H04L 45/02 |

(Continued)

*Primary Examiner* — Catherine Thiaw
(74) *Attorney, Agent, or Firm* — Banner & Witcott, Ltd.; Michael A. Springs

(57) ABSTRACT

Aspects of the present disclosure are generally directed to electronic computer implemented methods of data communication. Steps include receiving a data payload including an originating node attribute, a security ranking index attribute and at least one data element associated with a computer readable record. In another step, a method includes electronically sampling the data payload including the at least one data element and determining a value of the security ranking index attribute; In yet another step, a method includes electronically processing an injectable tracking attribute into the data payload. In a further step, a method includes electronically routing the digital record data payload including the originating node attribute, the injectable tracking attribute and the at least one data element associated.

12 Claims, 10 Drawing Sheets

(56) References Cited

U.S. PATENT DOCUMENTS

| | | | |
|---|---|---|---|
| 2017/0230402 A1* | 8/2017 | Greenspan | H04L 63/1425 |
| 2017/0366561 A1* | 12/2017 | Petersen | H04L 63/1416 |
| 2018/0018467 A1 | 1/2018 | Tsai et al. | |
| 2018/0124014 A1 | 5/2018 | Liang | |
| 2020/0007548 A1* | 1/2020 | Sanghavi | H04L 61/256 |

* cited by examiner

DATA MANAGEMENT SYSTEM AND METHOD

BACKGROUND

Moore's law predicted that the number of transistors on a computer chip would double every two years while the chip's price would remain constant. "Moore's law" meant consumers could buy the same technology two years later for about the same price. Fifty years later, Moore's law prediction has endured to the idea that technology companies have recognized Moore's law as a benchmark they must meet, or fall behind in the market. Patrons have come to expect technological products to be faster, cheaper, and more compact over time. This expectation seems to have driven trends of rapid growth in computing power, smaller devices, the ability to connect to the Internet, and reduction in cost and big data. There is a need to improve the technological processing in the new computing era.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are generally directed to electronic computer implemented methods of data communication and digital computer system, via a computer-based originating data communication network including a plurality of nodes, receiving a data payload including an originating node attribute, a security ranking index attribute and at least one data element associated with a computer readable record; electronically sampling the data payload including the at least one data element and determining a value of the security ranking index attribute; electronically processing an injectable tracking attribute into the data payload; electronically routing the digital record data payload including the originating node attribute, the injectable tracking attribute and the at least one data element associated; electronically extracting the injectable tracking attribute to determine a designation network location; and electronically transmitting the destination network location associated with the injectable tracking attribute to the originating data communication network for storage in a computer readable database.

Further aspects of the present disclosure are generally directed to electronic computer implemented methods of data communication and digital computer system An electronic computer implemented of data communication, via an originating data communication network including a plurality of nodes, receiving a data payload including an originating node attribute, a security ranking index attribute and at least one data element associated with a computer readable record; electronically determining a value of the security ranking index attribute; electronically processing an injectable tracking attribute into the data payload; electronically routing the digital record data payload including the originating node attribute, the injectable tracking attribute and the at least one data element associated; electronically extracting the injectable tracking attribute to determine a designation network location; and electronically transmitting the destination network location associated with the injectable tracking attribute to the originating data communication network for storage in a computer readable database to create a virtual network mesh.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
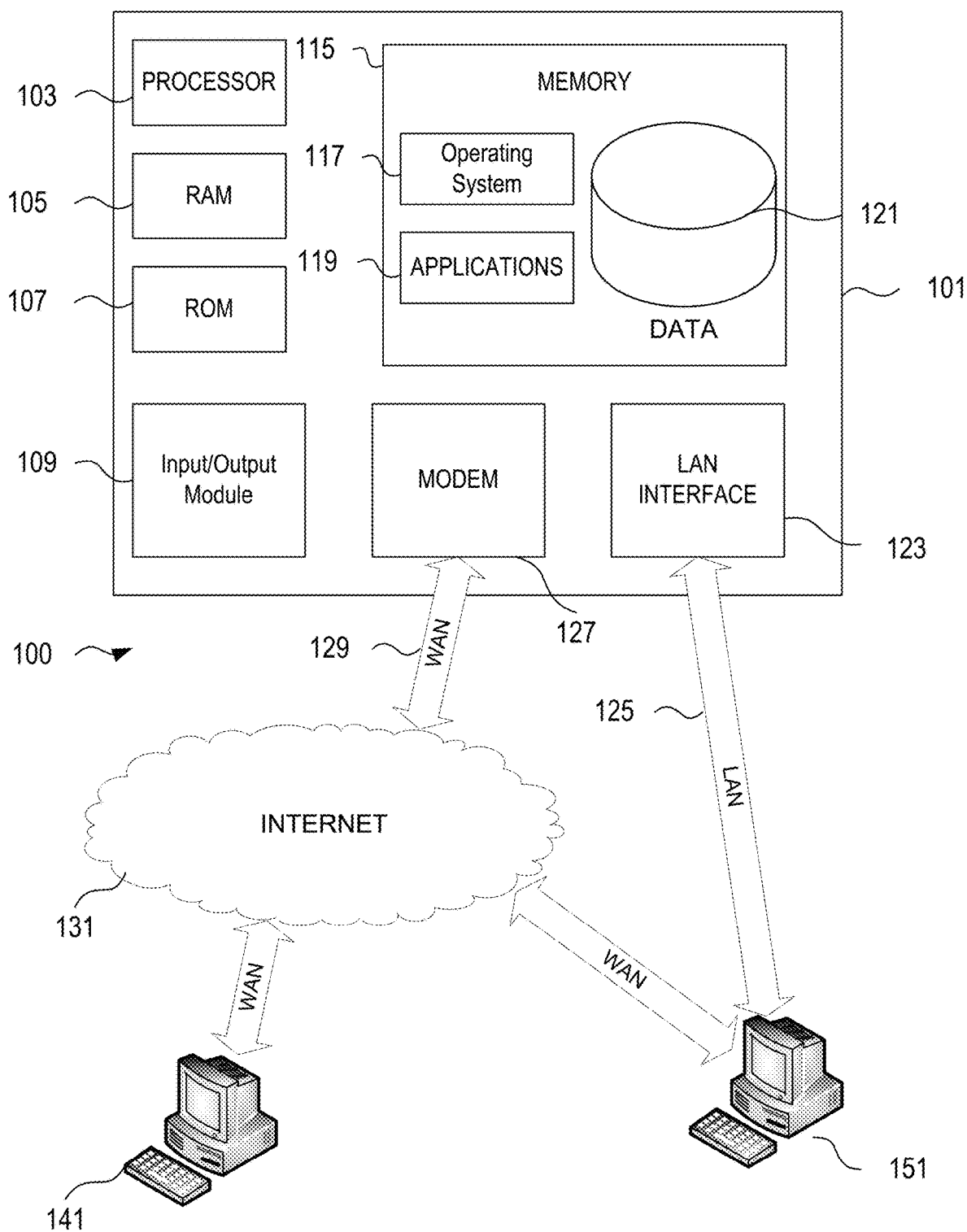
FIG. 1 illustrates a schematic diagram of a digital computing environment in which certain aspects of the present disclosure may be implemented.

FIG. 1 illustrates a block diagram of an specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
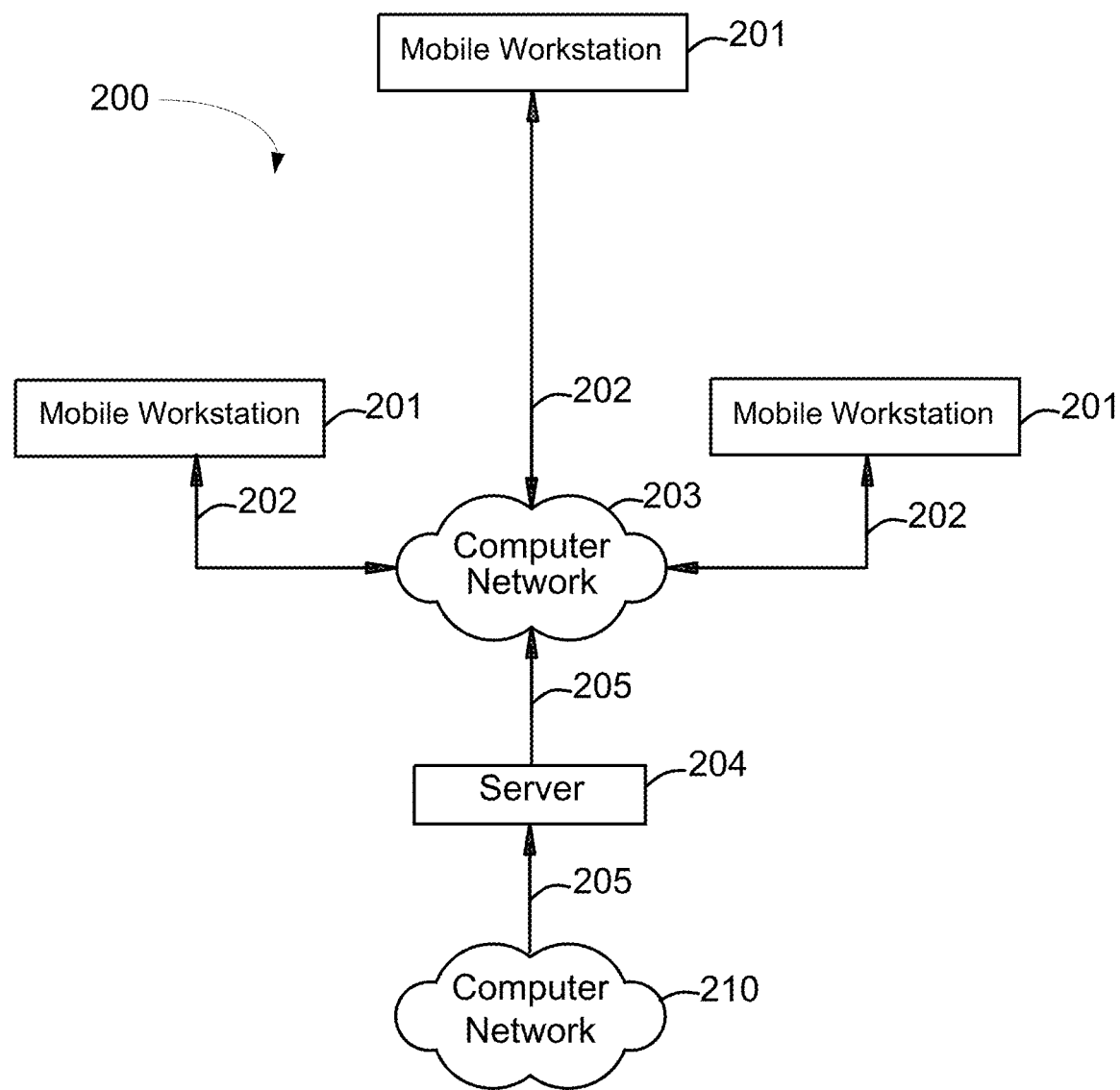
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3A:
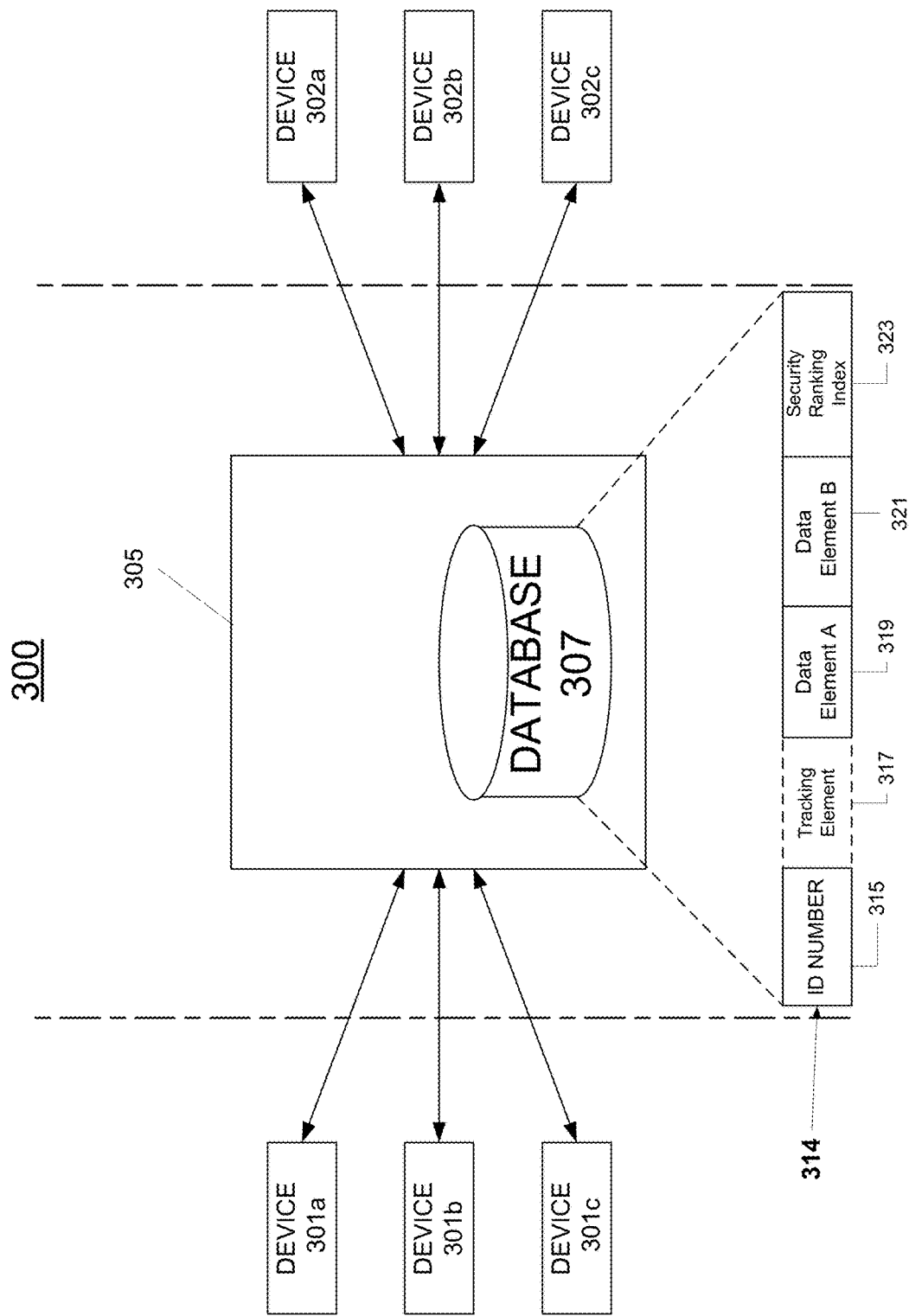
FIGS. 3A and 3B are an illustrative functional block diagram of workstations, database and servers that may be used to implement the processes and functions of certain embodiments.
Figure 3B:
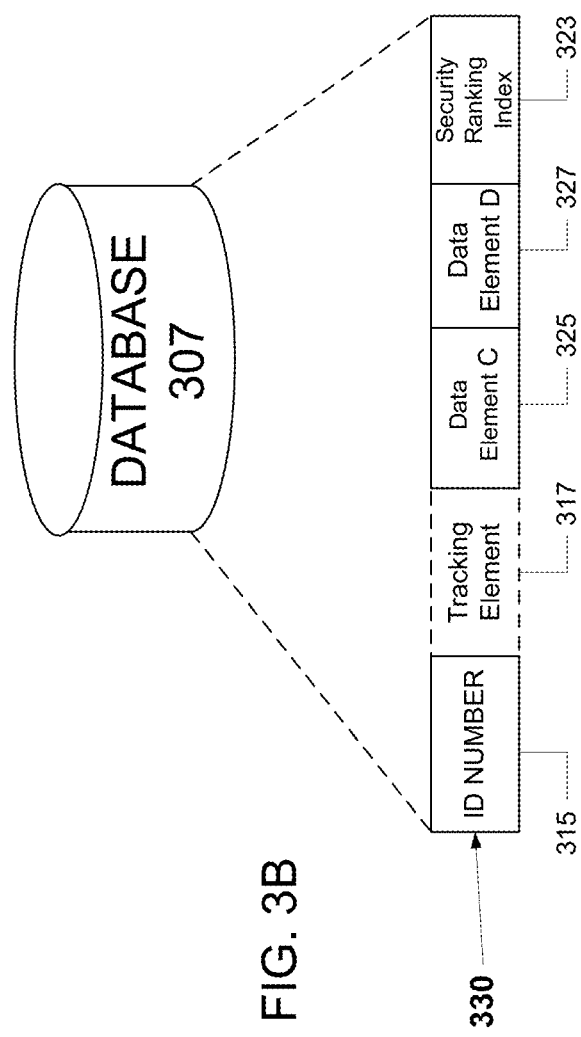

FIGS. 3A and 3B illustrate an example of representative infrastructure according to some embodiments in the disclosure. The different user devices 301a-301c, via terminals/workstations, electronically communicates with a plurality of different user devices 302a-302c, through the cloud-based processing system 300 including computer network 203, server 305 and electronic database 307. In one embodiment, users execute commands with terminals/workstations to exchange information with the processing system 300 such that the identities of the users are shielded from each other. These terminals may be standard personal computers as are known in the art. In alternative embodiments, the users may use hand-held, tablet computers or other portable electronic devices, such as smart phones or wearable device, as known in the art to communicate with the system 300.

The system 300 includes, for example and without limitation, server 305. Server 305 may include a messaging server, which may be used to receive and send data via email or over the Internet 131. The system 300 may use various attribute data in an Electronic Data Interchange (EDI) format for electronic tracking of specific data as discussed in the foregoing. Other formats of sending data over network could be used. Server 305 can process EDI messages sent through the processing system 300 to improve computer processing and machine learning functionality to thereby bring new tangible improved functions to the technology area. A user with device 301a-301c and 302a-302c may securely register to system 300 via a website URL registration service, an in-person registration service, a mail-in registration service, and/or some other registration service. A biometric device system may be included to allow for scanning of an iris of the user, retina scan, face recognition, and/or other types of biometric identification and authentication, including fingerprint scan analysis.

FIGS. 3A and 3B are merely illustrative and the number of, users and/or user terminals, servers and databases is not in any way limited. Furthermore, although various embodiments are described in the context of a single system, one of ordinary skill in the art may appreciate that the described functionality may be implemented across multiple systems. Moreover, a web site may be mirrored at additional systems in the network and, if desired, one or more management systems or other computer resources may be used to facilitate various functions. The computer program at the system 300 includes appropriate screen routines for generating a set of screens that together comprise a graphical user interface for the site.

The system 300 can provide messages in the communication cycle in an authenticated format, secure for each user that would be invited or authorized to be a part of the secure exchange. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, at least two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

According to some aspects of the disclosure, in one construction, the system 300 provides electronic messaging back and forth that inputs requests for selective network location from data set 314. The network 203 can be sending data using OSI Open Systems Interconnection (OSI) model, including the transport layer (OSI layer 4). Protocols such as TCP/IP may be utilized for transport of data. Referring to FIGS. 3A-3B, in one aspect, system 300 may use various attribute data, for example, in Electronic Data Interchange (EDI) format. In one implementation, the EDI message can use, for example, IPSEC circuity for secure encrypted communications or other encrypted protocols. The EDI messages can be electronically processed according any number of formats and data sequences. In one case, the digital record data set 314 EDI format and payload, may include an ID number 315, a tracking data element 317, a data element A attribute 319, a data element B attribute 321, and a security ranking index 323. The attribute tracking data 317 pertains to a determined network location, such as originating network, network 1 through 3 in FIG. 4. Security ranking index 323 may pertain to various data records, such as security level index ranking indicator. For example, security-ranking index may be a numerical spectrum for indication of a predetermined level of security of the data. In still one example, a numerical ranking of 4 being highly confidential; a numerical ranking of 3 being moderately confidential, a numerical ranking of 2 being confidential and a numerical ranking of 1 being some portions confidential. The tracking data element 317 may be hidden from the user or patron. In one way, the tracking data element 317 may be considered an injectable smart tracking tag. In the EDI format and payload, the "attribute data" may include ASCII characters in computer readable form or binary complied data. The ASCII characters or binary data can be manipulated in the software of system 300.

Figure 7:
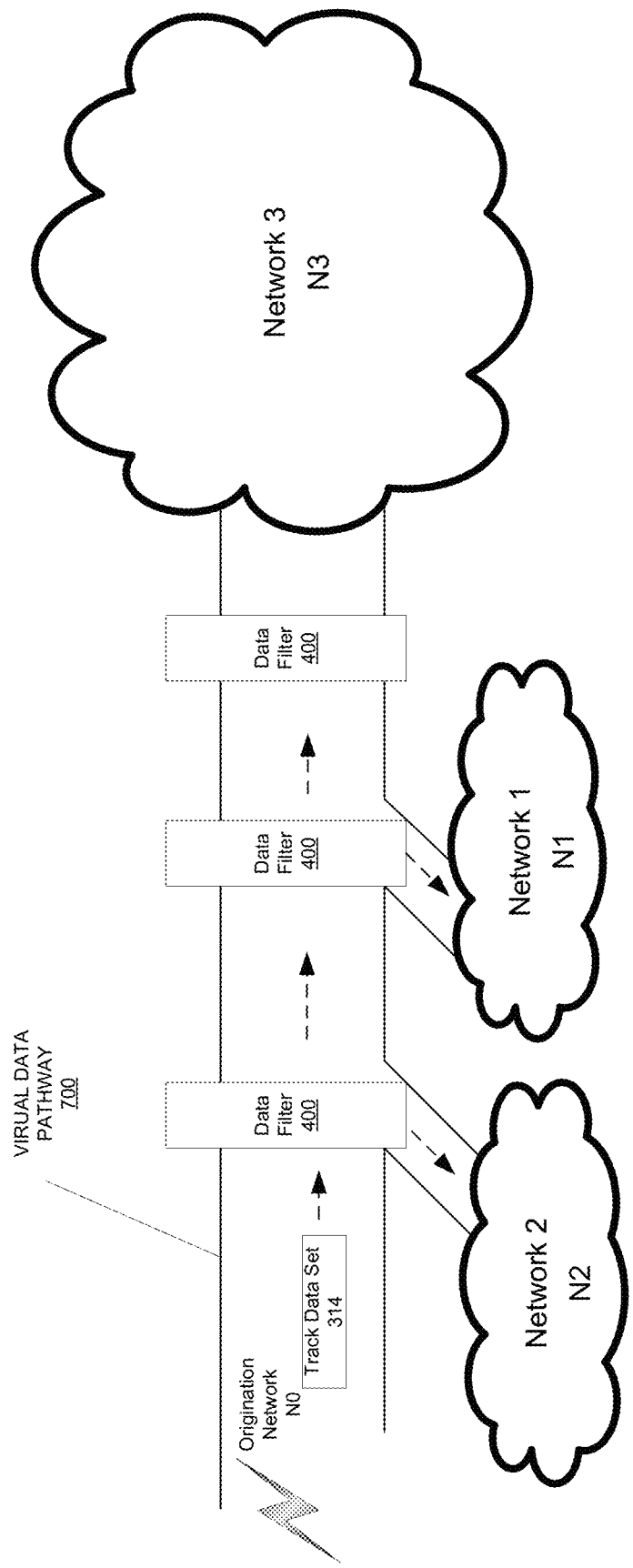
FIG. 7 is an example block diagram of an illustrative of network and dynamic data filter switch in accordance with at least one aspect of the present disclosure.
Figure 8:
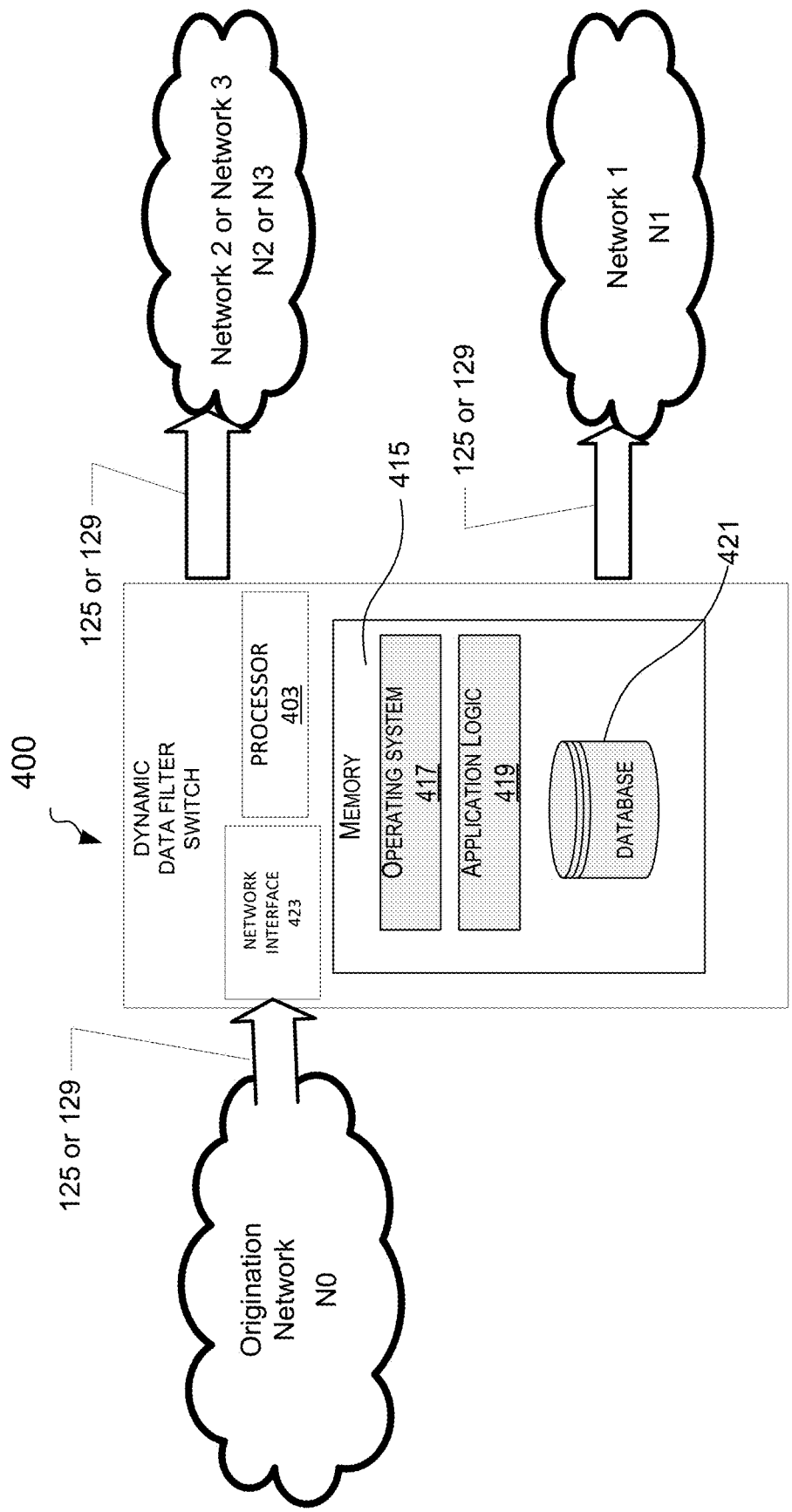
FIG. 8 is an illustrative block diagram of dynamic data filter switch that may be used to implement the processes and functions of certain embodiments.

Referring to FIGS. 7 and 8, a dynamic data filter switch 400 may include Application logic 419 that decodes the received data set 314 and samples the payload data from it. The dynamic data filter switch 400 may be placed at strategic locations in a virtual data pathway 700 in an Originating Network N0 as shown in FIG. 7. Dynamic data filter switch 400 includes a processor 403 for controlling overall operation of the switch and its associated components, including memory 415 and Application logic 419. Dynamic data filter switch 400 may include a network interface or adapter 423. It should be appreciated that the network connections 125, 129 shown are illustrative and other means of establishing a communications link between the computers may be used. Further, the virtual data pathway 700 may include an IPSEC circuit. Memory 415 may store software used by the switch 400, such as an operating system 417, and an associated database 421. The data filter switch 400 could be part of a data router or a standalone system. Using the Application logic 419, the data can be extracted from the data stream, such as portions of digital record data set 314 (e.g., a data element A attribute 319 or a data element B attribute 321). The sampled data can be checked using encryption to detect an alteration or data compromise from a baseline data from the originating network so that a cybersecurity risk can be evaluated by network control center. The payload data may include data elements, for example, a data element A attribute 319, and a data element B attribute 321 that can be any appropriate data element pertaining to electronic data records stored for a user or patron and a security ranking index 323 may include a security ranking indication as discussed in the foregoing.

Memory 415 of dynamic data filter switch 400 may be engaged by the Application Logic 419, to include operating instructions stored in a non-transitory computer readable memory/database, as well as for storing status information, such as a virtual copy of the sampled/extracted data, such as portions of data set 314. The Application logic 419 provides for a computer implement method for the sampling of the data stream (See FIG. 7 for data filer switch 400 placements). In particular, the memory 415 may be used for storing software or other instructions that are executed by the Application logic 419 to achieve the functionality described herein, in which one implementation the memory 415 may be considered a program storage device. Memory 415 may further store operating system software 417 for controlling overall operation of the device 400. Nevertheless, the program operating instructions of Application logic 419 can be stored in non-transitory computer readable database 421.

Still referring to FIGS. 7 and 8, data set 314 can be extracted or sampled from the data stream, and if a network data security issue is detected, the sampled data and security ranking may be used to determined data nodes or points for analysis or retouring of data to other networks. In one implementation, the sampling of the data stream could include a checksum function operation, including a minimum checksum value. For example, a checksum may be a digit representing the sum of the correct digits in the transmitted digital data 314, against which later comparisons can be made to detect errors or alternations in the data 314. In another implementation, the Application logic 419 could sample a data element and the security-ranking index. In one implementation, responsive to a threshold value of the security ranking attribute 323, if an alternation is detected in the extracted sample, the dynamic data filter switch 400, in real-time, may provide the injectable tracking element 317 within the data stream. The data set 314 with tracking element 317 may be then be allowed to proceed to the designation network based upon the various scoring factors, such as the security-ranking index level and type of data records. For instances, a threshold value of the security ranking attribute 323 could be greater than 2 ranking (based on a ranking spectrum of 1-4).

In another implementation, if an alternation is detected in the extracted sample, the dynamic data filter switch 400, in real-time, may provide the injectable tracking element 317 within the data stream regardless of the security ranking. In accordance with a data track rule base of system 300, the tracking data element 317 may be activated at the insertion in the data stream. Such data track rule base parameters can include notification of the designation network when the data arrives in accordance with OSI Open Systems Interconnection (OSI) model, including the transport layer (OSI layer 4).

Referring to FIGS. 7 and 8, in one implementation the data filter switch 400 and application logic 419 may include receiving a data payload including an originating node attribute 325, a security ranking index attribute 323 and at least one data element 319, 321 associated with a computer readable record 314. In another step, application logic 419 may include electronically sampling the data payload including the at least one data element 319, 321 and determining a value of the security ranking index attribute 323. In yet another step, 317, application logic 419 may include electronically processing injectable tracking attribute 317 into the data payload. In a further step, application logic 419 may include electronically routing the digital record data payload including the originating node attribute, the injectable tracking attribute and the at least one data element associated. Other steps of application logic 419 may include electronically extracting the injectable tracking attribute to determine a designation network location; and electronically transmitting the destination network location associated with the injectable tracking attribute to the originating data communication network for storage in computer readable database 307.

Figure 9:
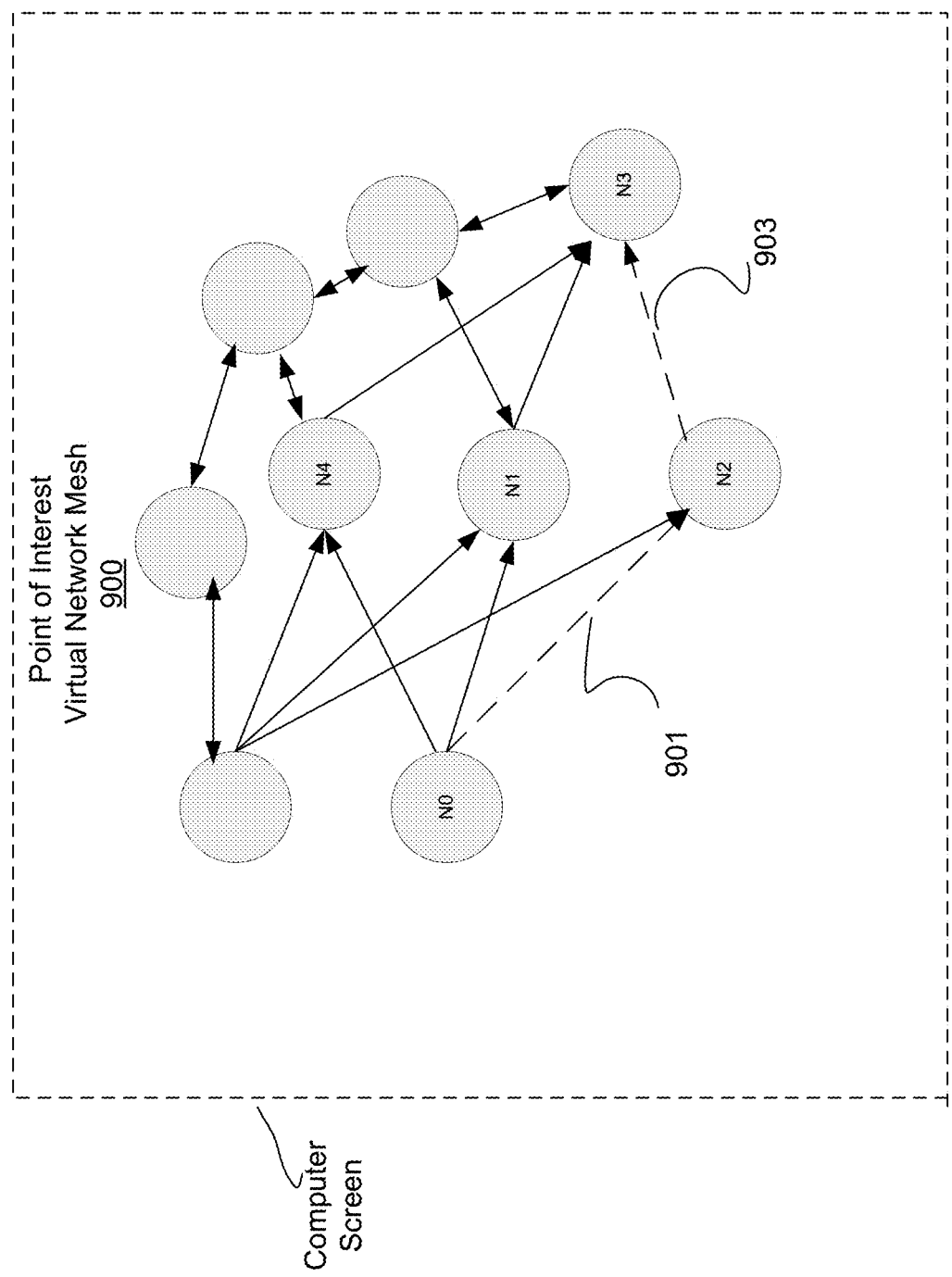
FIG. 9 is an illustrative block diagram of a point of interest network mesh that may be used to implement the processes and functions of certain embodiments.

Referring to FIG. 9, once the data element A attribute 319, and/or a data element B attribute data 321 are transferred out of the Originating Network N0 to Networks 1-4, for example, then the digital track record data set 314 with tracking data element 317 can provide network location data back to the Originating Network via transport layer (OSI layer 4) and stored via a log electronically linked in or to system 300. The indication of the security at-risk rank designation network or security at-risk network data path can be provided on a computer readable storage of database 307. This creates a virtual point of interest network mesh 900 for further analysis with a network control center or other cybersecurity function. In the example of FIG. 9, potential security at-risk networks N1, N2 and pathways 901, 903 may be of interest for further analysis. Pathway 901 pertains between Originating Network N0 and Network N1. Pathway 903 pertains to Network N1 and Network N2. The virtual point of interest network mesh 900 can displayed on a computer display screen such as computer 151 (FIG. 1) in a graphical user interface. Referring to FIGS. 7, and 9, in a further implementation, after the networks of interest are determined, the data filter switch 400 (application logic 419) may include a step of rerouting data away from those identified security risk networks. This step would include reading the header information of the data set 314. Thus, the systems disclosure in the present application provided for improving cybersecurity technology in a data communication network.

Figure 4:
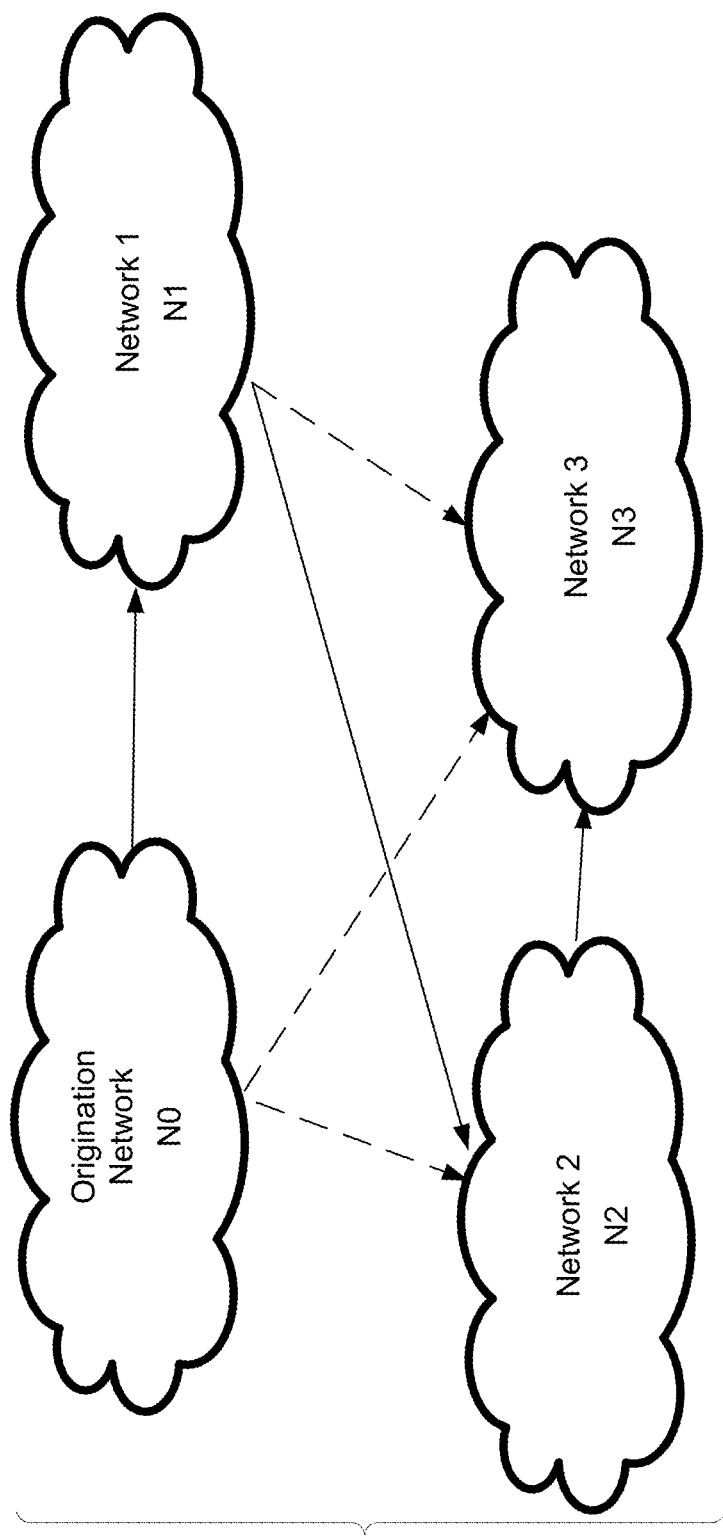
FIG. 4 is an example block diagrams of networks of an illustrative method for in accordance with at least one aspect of the present disclosure.
Figure 5:
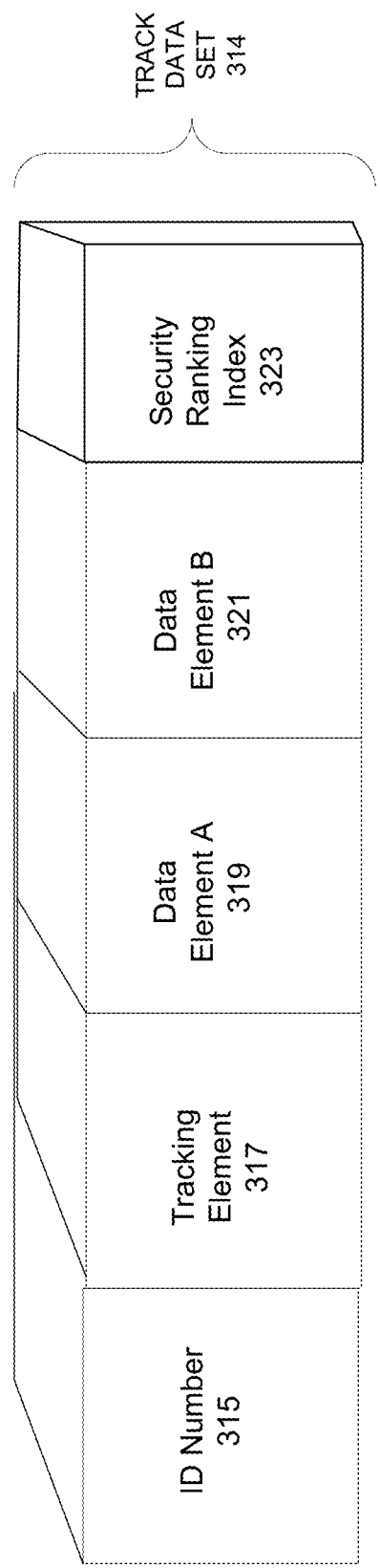
FIG. 5 is an example block diagram of an illustrative data set in accordance with at least one aspect of the present disclosure.

The steps that follow in the FIG. 4 may be implemented by one or more of the components in FIGS. 1, 2, 3A-3B and 6-7 and/or other components, including other computing devices. Referring to FIG. 4, in a general overview, system 300 electronically maintains a plurality of digital record data sets 314 for users associated in a computer readable electronic database 121. In such an example, the separate digital record data set 314 may be stored within a non-transitory computer readable memory/database, such as memory 115 and/or RAM 105 in FIG. 1 or electronic database 307 of FIGS. 3A-3B. A user with device 301a-301c electronically communicates with system 300 and devices 302a-302c via system 300.

The steps that follow and can be implemented to include a computer readable transaction history or log of the status within process flows that can be maintained or otherwise stored within a memory/database, such as memory 115 and/or RAM 105 in FIG. 1 or electronic database 307 of FIGS. 3A-3B. Regarding the construction with digital record data set 314, a data element A attribute 319, and a data element B attribute data 321 can be any appropriate data element pertaining to electronic data records stored for a user or patron. In one example, data element A attribute 319, data element B 321 attribute can be associated with a data of a user profile or transaction history for physical products. Alternatively, data element A 319, data element B 321 can be associated with a data of transactions transfer of electronic store of values.

Figure 6:
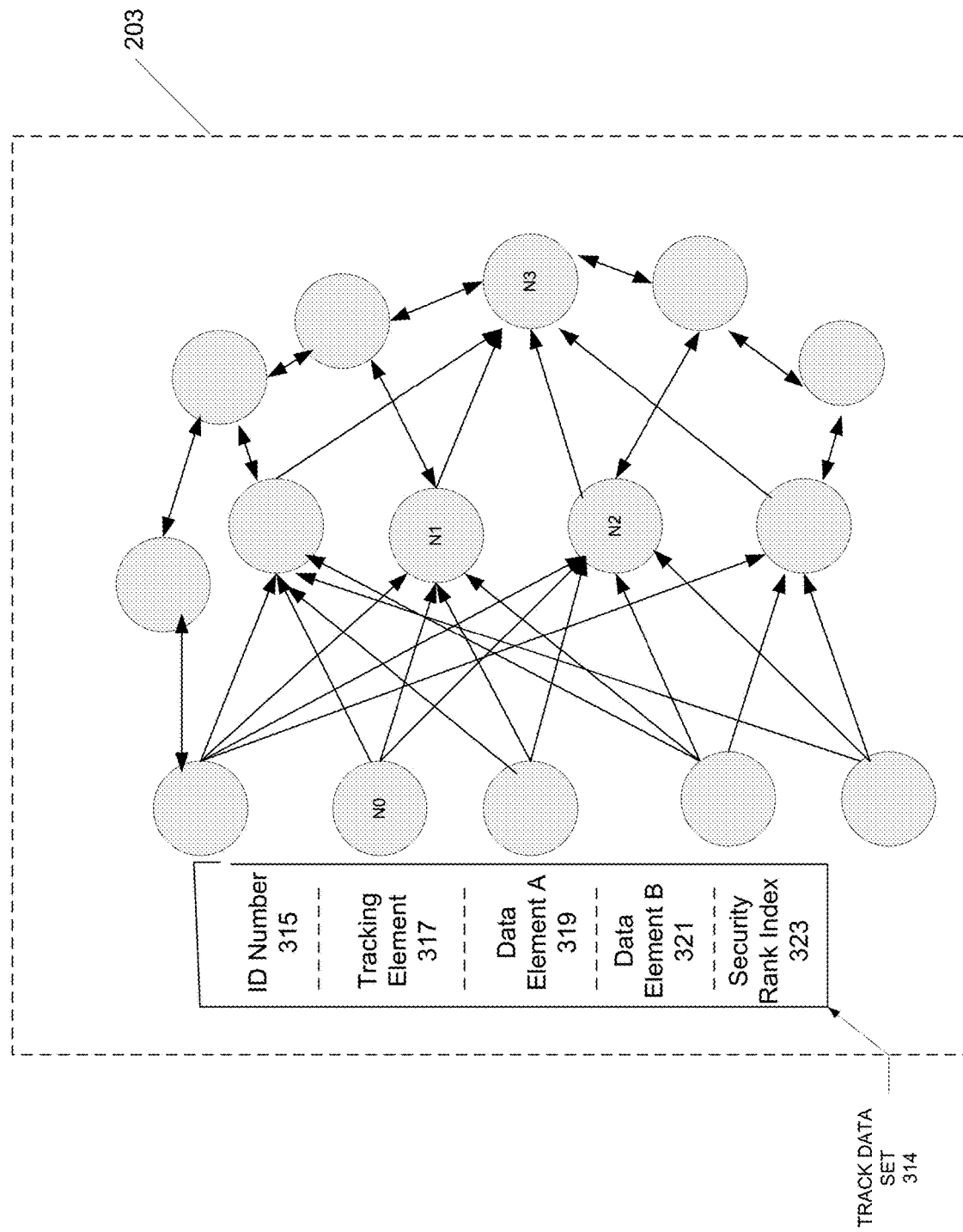
FIG. 6 is an illustrative block diagram of a network with data that may be used to implement the processes and functions of certain embodiments.

Referring to FIGS. 4 and 6, process flow of system 300, the various items in network/steps N0-N3, are electronic logically via computer readable instructions linked to electronic attribute data for EDI message processing via system 300 and Networks N0-N3. The system 300 may then employ selective attribute data in the Electronic Data Interchange (EDI) format to form a tokenized/container data form for data transfer. For example, in Step N0, and referring to FIG. 3B, a temporary mirrored digital record data set 330 can be created in the memory/database 307 with at least one ID number 315, and data tracking element attribute 317, a data element C attribute 325, a data element D attribute 327 and security ranking indicator 323. Linked digital record data set 330 is based the same data of set 314 but is stored to keep of record the data sent out of originating network. In one example, Data element C attribute 325 can be copy of Data element A 319, and a data element D attribute 327 is copy of a data element B attribute 321. This implementation is provided in the case that the transfer data, data element A attribute 319, data element B 321 might be changed once outside of the originating network N0. The digital record data set 314 has arrived at Network 1 for travel to Network 2. In one example at Network N1, the digital record data set 314, tracking element 317 can send back a notification to the originating network linked log and with the ID number 315 and in a further option, via an automatic push notification or a report can send to the authorized user/owner of the digital record data set 314 an electronic mail, text messaging via Short Messaging Service (SMS) component of phone, web, or mobile communication systems, using standardized communication protocols that allow the exchange of short text messages between fixed line or mobile phone devices.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. A computer implemented of data communication, comprising:
    via a computer-based originating data communication network including a plurality of nodes, receiving an EDI (Electronic Data Interchange) digital record data payload including an originating node attribute, a security ranking index attribute and at least one data element associated with a computer readable record;

electronically sampling the EDI digital record data payload including the at least one data element and determining a value of the security ranking index attribute;

electronically processing an injectable tracking attribute into the EDI digital record data payload;

electronically routing the EDI digital record data payload including the originating node attribute, the injectable tracking attribute and the at least one data element associated;

electronically extracting the injectable tracking attribute to determine a designation network location; and electronically transmitting the designation network location associated with the injectable tracking attribute to the originating data communication network and determining a security-at-risk network from a virtual network mesh.

2. The method of claim 1, further comprising a step of transmitting via the EDI digital record data payload with electronic message to a device associated with the injectable tracking attribute.

3. The method of claim 1, further comprising a step of creating a virtual data payload associated with the computer readable record of the originating data communication network.

4. The method of claim 1, further comprising a step of processing the EDI digital record data payload includes responsive to a threshold value of the security ranking index attribute, electronically processing the injectable tracking attribute into the EDI digital record data payload.

5. One or more non-transitory computer readable media storing computer executable instructions that, when executed by at least one processor, cause the at least one processor to perform a data communication method, comprising:

via a computer-based originating data communication network, receiving an EDI (Electronic Data Interchange) digital record data payload including an originating node attribute, a security ranking index attribute and at least one data element associated with a computer readable record;

electronically sampling the EDI digital record data payload including the at least one data element and determining a value of the security ranking index attribute;

electronically processing an injectable tracking attribute into the EDI digital record data payload;

electronically routing the EDI digital record data payload including the originating node attribute, the injectable tracking attribute and the at least one data element associated;

electronically extracting the injectable tracking attribute to determine a designation network location; and electronically transmitting the designation network location associated with the injectable tracking attribute to the originating data communication network and determining a security-at-risk network from a virtual network mesh.

6. The one or more non-transitory computer readable media of claim 5, further comprising a step of transmitting via the EDI digital record data payload with an electronic message to a device associated with the injectable tracking attribute.

7. The one or more non-transitory computer readable media of claim 5, further comprising a step of creating a virtual data payload associated with the computer readable record of the originating data communication network.

8. The one or more non-transitory computer readable media of claim 5, further comprising a step of processing the EDI digital record data payload including responsive to a threshold value of the security ranking index attribute, electronically processing the injectable tracking attribute into the EDI digital record data payload.

9. A digital computer system, comprising:

at least one computer readable database configured to maintain a plurality of computer readable nodes; and at least one computing device, operatively connected to the at least one computer readable database, configured to:

receive an EDI (Electronic Data Interchange) digital record data payload including an originating node attribute, a security ranking index attribute and at least one data element associated with a computer readable record;

electronically sample the EDI digital record data payload including the at least one data element and determining a value of the security ranking index attribute;

electronically process an injectable tracking attribute into the EDI digital record data payload;

electronically route the EDI digital record data payload including the originating node attribute, the injectable tracking attribute and the at least one data element associated;

electronically extract the injectable tracking attribute to determine a designation network location; and electronically transmit the designation network location associated with the injectable tracking attribute to the originating data communication network and determining a security-at-risk network from a virtual network mesh.

10. The system of claim 9, wherein the at least one computing device being operatively connected to the at least one computer readable database is configured to further comprise a step of transmitting via the EDI digital record data payload with electronic message to a device associated with the injectable tracking attribute.

11. The system of claim 9, wherein the at least one computing device being operatively connected to the at least one computer readable database is configured to further comprise creating a virtual data payload associated with the computer readable record of the originating data communication network.

12. The system of claim 11, wherein the at least one computing device being operatively connected to the at least one computer readable database is configured to further comprise processing the EDI digital record data payload including responsive to a threshold value of the security ranking index attribute, electronically processing the injectable tracking attribute into the EDI digital record data payload.

* * * * *